United States Patent
Roe et al.

[15] 3,649,323
[45] Mar. 14, 1972

[54] TITANIUM DIOXIDE PIGMENTS

[72] Inventors: George Ryburn Roe, 134 Ridge Drive, Amherst, Va. 24521; Gerard Martin Sheehan, 2424 Mimosa Drive, Lynchburg, Va. 24503; Donald Edward Knapp, 2607 Westhaven Pl., Lynchburg, Va. 24501

[22] Filed: Sept. 12, 1969

[21] Appl. No.: 857,583

[52] U.S. Cl. ..................106/300, 106/308 N, 241/5, 241/16
[51] Int. Cl. .........................................C09c 1/36
[58] Field of Search ..................106/300, 308 N; 241/16

[56] References Cited

UNITED STATES PATENTS

| | | |
|---|---|---|
| 2,737,460 | 3/1956 | Werner..................................106/300 |
| 2,744,029 | 5/1956 | Kingsbury..............................106/300 |
| 2,933,408 | 4/1960 | Dempster et al......................106/300 |
| 3,015,573 | 1/1962 | Myers et al. ..........................106/300 |
| 3,076,719 | 2/1963 | Whately et al.......................106/300 |
| 3,506,466 | 4/1970 | Bramekamp et al..................106/300 |

*Primary Examiner*—Daniel E. Wyman
*Assistant Examiner*—H. M. S. Sneed
*Attorney*—Roland A. Dexter

[57] ABSTRACT

Titanium dioxide pigment of improved water dispersibility and stable viscosity when incorporated into an aqueous system, particularly an aqueous system of high calcium and magnesium ion content, resulting from the presence of a normal, non-volatile, polyhydric alcohol in combination with an alkanolamine. The polyhydric alcohol is represented by sorbitol and mannitol, while the amine is represented by triethanolamine.

5 Claims, No Drawings

TITANIUM DIOXIDE PIGMENTS

The present invention relates to dry titanium dioxide pigment of improved dispersibility in systems where fluid suspensions of high solids content are required. The invention particularly relates to such pigment of improved water dispersibility and stable, fluid viscosities in the aqueous system as the result of the presence of a normal nonvolatile polyhydric alcohol in combination with an alkanolamine.

Titanium dioxide is at present the premier white pigment of commerce. It is generally produced by either hydrolyzing an aqueous solution of a titanium salt such as a sulfate and calcining the hydrolysate at 750°–1,000° C. or oxidizing a titanium halide, e.g., titanium tetrachloride, at elevated temperatures of 1,000° C. and higher, followed by cooling to a temperature below 600° C. The titanium dioxide pigment resulting from the calcination and oxidation contain a substantial amount of oversized gritty particles which are dispersed by either wet or dry grinding. Drying, following wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An optimum means for dry grinding is the fluid energy mill in which the pigment particles are conveyed by a gaseous fluid, such as air or steam, into the outer portion of an inwardly spiralling vortex at high velocity and in a manner which will maintain the vortex at a high rotative speed and a relatively low inward speed whereby the pigment aggregates are fractured.

Triethanolamine alone and with an aerogel has been suggested as a dispersion aid during grinding to enhance the fineness and gloss of titanium dioxide pigments. It has also been suggested that water dispersible titanium dioxide pigments can be produced from calcined pigment material which has been wet milled and preferably hydro-separated by utilizing certain amines as organic dispersants, which amines include monoethanolamine, morpholine and triethanolamine. Unfortunately, aqueous slurries of high solids content (70 percent by weight and higher) of such pigments tend to form upon standing a hard sediment which is difficult to redisperse.

It is also known that generally water-dispersible $TiO_2$ pigments form a deflocculated slurry in hard water and consequently settle within 2–3 hours into a very coherent sediment which is extremely difficult to reincorporate to a uniform slurry.

The sedimentation characteristics of such aqueous dispersions of dry titanium dioxide particles have been improved by the presence of normal water soluble polyols, including sorbitol and mannitol. Unfortunately, such polyols frequently degrade when exposed to high temperatures and cause noticeable discoloration.

It is an object of the invention to overcome the foregoing and related disadvantages of water dispersible titanium dioxide pigments.

It is a further object of the invention to obtain a dry titanium dioxide pigment which can be readily dispersed into a high solids content, aqueous, surface coating system which is viscosity stabilized, i.e., has resistance to flocculation and settling in water.

In accordance with the object of the invention there had been produced dry titanium dioxide pigment particles admixed with a small but effective amount of a normal, nonvolatile polyhydric alcohol, for example, sorbitol, and an alkanolamine.

It has been discovered that dry titanium dioxide pigment particles which have been admixed with a small amount of a viscosity stabilizer such as sorbitol and triethanolamine are materially improved in their dispersibility and resistance to flocculation in water, particularly hard water systems having high calcium and/or magnesium ion content.

The pigment of the invention possesses the following advantages:

1. Although it deflocculates substantially the same as existing pigments, when slurried at high solids loading, it does not settle into hard sediment nor does it settle to any substantial extent over long periods of time in hard water. Calcium and magnesium ions normally accelerate flocculation of water dispersible $TiO_2$ pigments, but when slurried to 50 percent solids content in water having a hardness equivalent to 400 p.p.m. calcium carbonate the pigment of the invention does not settle hard and the resultant slurry is stabilized at a useful viscosity for at least one week.

2. A high solids (72.5 percent by weight) aqueous slurry produced from our viscosity stabilized pigment has both low viscosity and resistance to flocculation over extended storage.

3. This dry milled pigment contains fewer agglomerates thereby reducing the need for further grinding.

4. The pigment is stable. The treatment is relatively nonvolatile so that the dispersibility characteristics of the pigment are long-lasting.

The amount of the viscosity stabilizing agent carried by pigment of the present invention is small. The minimum effective amount has not yet been determined, but the evidence is that this minimum is about 0.2 percent of the dry weight of the pigment. At the other extreme, pigment carrying more than about 3 percent by weight of the agent possesses closely similar properties to the properties possessed by pigment carrying somewhat less agent, so that the value of 3 percent is taken as the upper practical limit. In practice we find that the optimum amount of agent occurs within the range of about 0.2 to 1 percent, and this range is accordingly preferred.

As noted above, the viscosity stabilizing agent is a normal, nonvolatile polyhydric alcohol, which includes sorbitol and mannitol, in combination with an alkanolamine. Representative of the alkanolamines is triethanolamine.

The titanium dioxide pigment benefited by the present invention includes those grades which contain small amounts of alkali metal and alkaline earth metal salts as conditioning agents; the salts of other metals such as antimony and zinc as brighteners and rutile converters. The amount of these salts and agents is usually less than 5 percent of the weight of the pigment.

Pigment according to the present invention can be prepared according to a number of procedures. One convenient method is to meter the input feed of the treating agent and the pigment into a fluid energy mill. With care it is possible to meter the small amount of treating agent uniformly into the stream of pigment prior to entry to the mill, and the mill action may aid in distributing the agent among the particles.

In practice, it is more convenient to supply the reagents by the use of a solvent medium. According to this method the reagents are dissolved in a suitable solvent and the solution added to dry titanium dioxide pigment prior to milling. Although each of the above reagents improves the compatibility of the pigment with hard water, the combination of sorbitol and triethanolamine gave pigment with best slurry properties.

The following table, which reports exposure of various anatase titanium dioxide pigment samples to elevated temperatures, shows the inhibiting action of the alkanolamine upon the discoloration resulting from the use of polyhydric alcohols.

| Sample | Added to Pigment | Initial | Brightness Rating 75° C. for 1 hr. | 125° C. for 1 hr. |
|---|---|---|---|---|
| 1 | 0.25% Sorbitol | 97 | 94 | 94 |
| 2 | 0.25% TEA plus 0.25% Sorbitol | 98 | 97 | 97 |

The invention will be further described by the examples which follow. These examples represent specific embodiments of the invention, are not to be construed as limitations thereon and illustrate viscosity stabilization in hard water obtained by use of titanium dioxide pigment according to the present invention. The hard water of the examples has a hardness equivalent of 650 p.p.m. calcium carbonate and is produced by adding $CaCl_2 \cdot 2H_2O$ (0.815 g.) and $MgCl_2 \cdot 6H_2O$ (0.285 g.) to one liter of distilled water having a minimum specific resistance of 150,000 ohm-cm. The pigment of Runs A-1 to A-19 is anatase calciner discharge, of Runs C-1 to C-4 is rutile from the oxidation of titanium tetrachloride and of Runs D-1 to D-4 is rutile from the sulfate process. The sorbitol was introduced both as a 70 percent aqueous solution and as a solid. After mixing the additives, the admixed pigment was processed through an 8-inch diameter laboratory micronizer using super-heated steam at 460°–470° F. at 120 p.s.i.g. The admixed and ground pigment was then slurried into test slurries of 50 percent solids content and the initial viscosity measured. All reported viscosities were measured at 25° C. by a Brookfield viscosimeter Model LVF using the No. 4 spindle at 60 r.p.m. and reported as cps. The samples where then placed on pebble mill rack rollers, rotated at 30 r.p.m. and the viscosity noted at 1-day intervals for 7 days.

A slurry was considered as having passed the test if at the end of 7 days it remained in a fluid "pourable" state which meant the viscosity should remain below 3,000 centipoises (cps).

EXAMPLE I

Sorbitol added as 70 percent aqueous solution—pigment is anatase calciner discharge.

| Run No. | Organic added to pigment (weight percent) | | Organic retained after dry milling (weight percent) | After seven days stability, cps. | Sediment form |
|---|---|---|---|---|---|
| | Sorbitol | TEA [1] | | | |
| Control | | | | ([2]) | |
| A-1 | 0.9 | | 0.6 | 100 | Soft. |
| A-2 | | 1.0 | 0.3 | 100 | Hard. |
| A-3 | 0.9 | 1.0 | 0.6 | 100 | Soft. |
| A-4 | 1.8 | | 1.0 | 50 | Do. |
| A-12 | 0.135 | | 0.135 | [3] 7,500 | |
| A-13 | 0.068 | 0.08 | 0.11 | [4] 3,660 | |
| A-15 | 0.22 | | 0.22 | 100 | Do. |
| A-16 | 0.113 | 0.13 | 0.23 | 50 | Do. |
| A-19 | 0.18 | 0.20 | 0.34 | 50 | Do. |

[1] TEA = Triethanolamine.
[2] Greater than 10,000 (not pourable).
[3] Not pourable.
[4] Just pourable.

EXAMPLE II

Sorbitol added as solid—pigment is rutile produced by oxidation $TiCl_4$.

| | Sorbitol | TEA | | |
|---|---|---|---|---|
| Control | — | — | — | Greater than 10,000 (not pourable) |
| C-4 | 0.25 | 0.25 | 0.49 | 50 |

EXAMPLE III

Sorbitol added as solid—pigment is rutile from sulfate process.

| | Sorbitol | TEA | | |
|---|---|---|---|---|
| Control | — | — | — | Greater than 10,000 (not pourable) |
| D-4 | 0.25 | 0.25 | 0.49 | 50 |

The dry milled, water dispersible pigment of the invention can be slurried at any plant location with even "hard water" to a high solids content (at least 50 percent) without risk of hard settling of the $TiO_2$ or significant viscosity increase of the slurry. Its utility lies in its universality for it can be shipped and/or stored as dry titanium dioxide pigment in bulk or as high solids content slurries with much reduced concern for dispersion and deflocculation. The pigment has utility in both oil and water based coating composition formulas.

We claim:

1. Dry titanium dioxide pigment particles having admixed therewith from 0.2 to 3.0 weight percent of said particles of a normal nonvolatile polyhydric alcohol of the class consisting of sorbitol, mannitol and mixtures thereof and an alkanolamine, said admixture consisting of at least 0.1 weight percent of said particles of each component, whereby the dispersibility of said particles in water is improved and the viscosity of resultant high solids content slurries is stabilized.

2. The particles of claim 1 admixed with from 0.2 to 1.0 percent of said admixture, said percent based upon said particles.

3. A pigment according to claim 1 wherein the alkanolamine is triethanolamine.

4. A process for producing the particles of claim 1 comprising the step of dry milling anhydrous titanium dioxide particles and recovering the milled dry titanium dioxide pigment characterized by adding the normal nonvolatile polyhydric alcohol and alkanolamine prior to dry milling and the milling means is fluid energy.

5. A high-solids content aqueous slurry of the pigment prepared in claim 3.

* * * * *